No. 866,544.     PATENTED SEPT. 17, 1907.
W. M. WALTERS.
SCREW PROPELLER.
APPLICATION FILED SEPT. 27, 1906.

2 SHEETS—SHEET 1.

Witnesses                                               Inventor
W B Johnson                                     William Miller Walters.
Geo Walters.

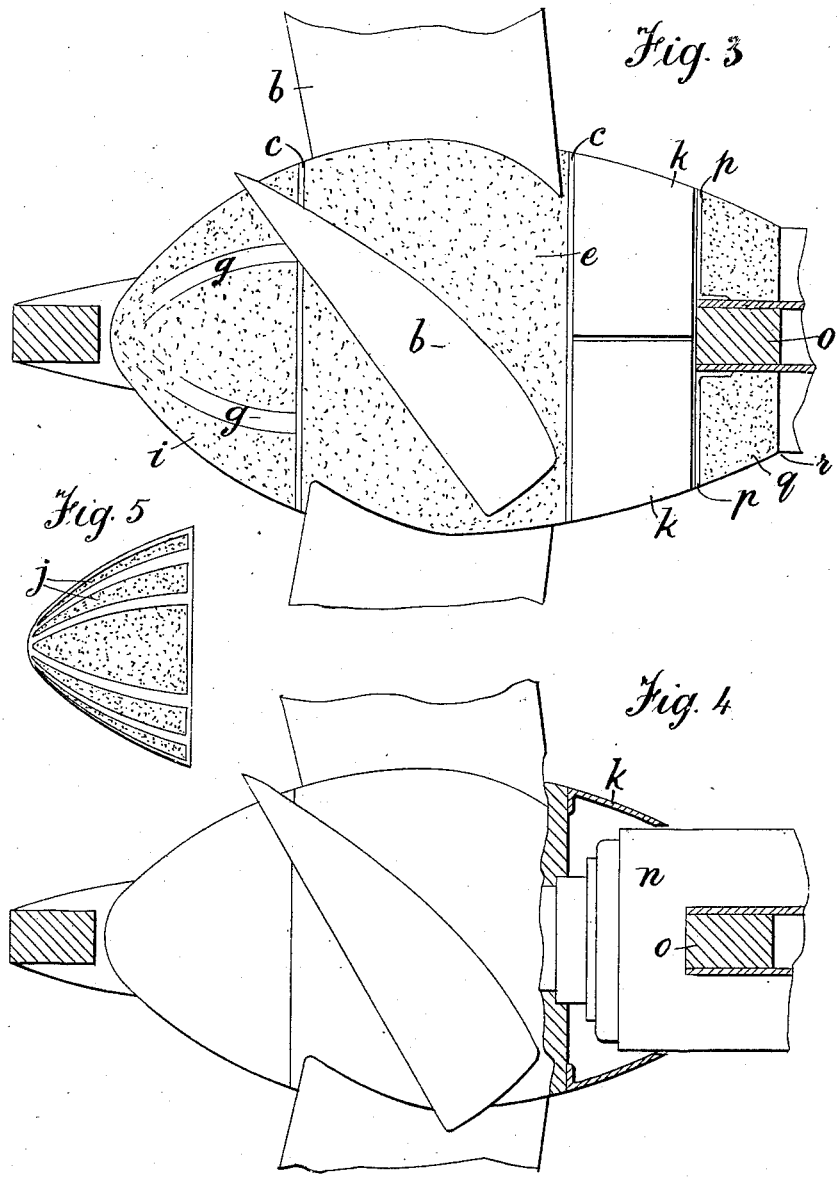

UNITED STATES PATENT OFFICE.

WILLIAM MILLER WALTERS, OF LIVERPOOL, ENGLAND.

SCREW-PROPELLER.

No. 866,544.          Specification of Letters Patent.          Patented Sept. 17, 1907.

Application filed September 27, 1906. Serial No. 336,433.

*To all whom it may concern:*

Be it known that I, WILLIAM MILLER WALTERS, a subject of the King of Great Britain, residing at Liverpool, in the county of Lancaster, England, have invented new and useful Improvements in and Connected with Screw-Propellers, of which the following is a specification.

Figure 1:
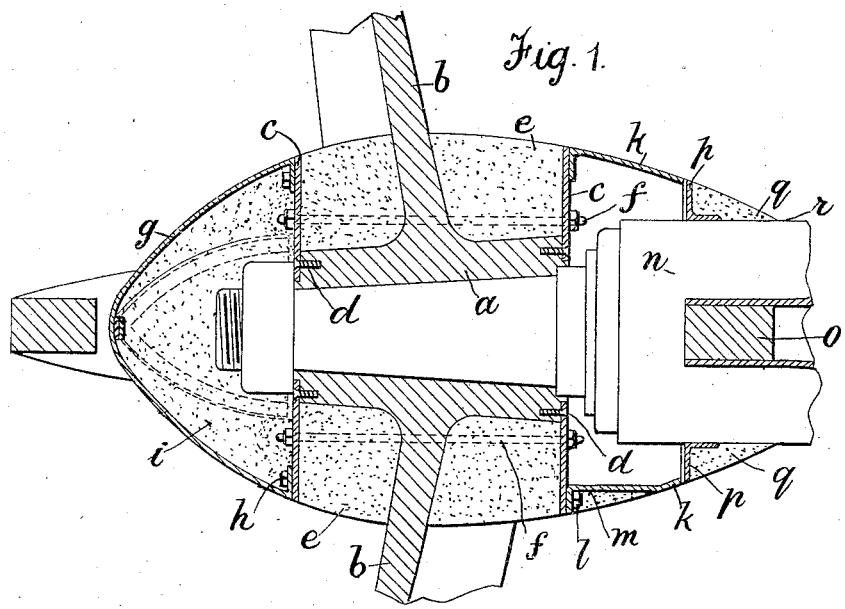
Figure 2:
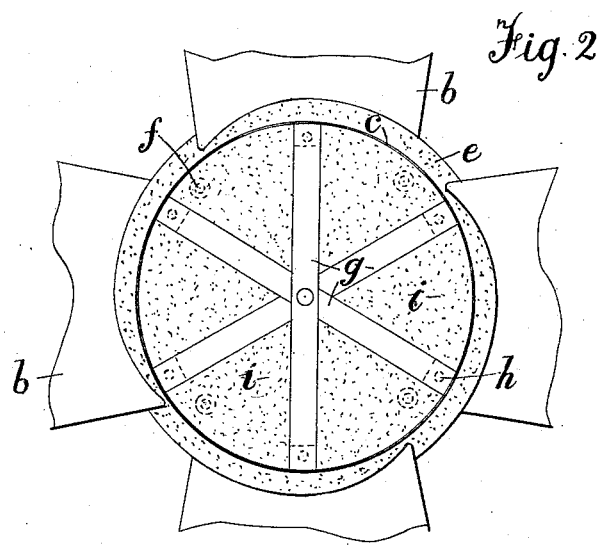

The objects of the invention are to reduce resistance in propellers with large central bosses, while preventing fouling of the propeller or shaft by floating ropes &c, and to construct the large bosses and the cones on the after side thereof so that they shall not be objectionably heavy. I attain these objects by the construction and arrangements of parts shown on the accompanying drawings whereon Figure 1 is a horizontal central section through the boss of a propeller in position on its shaft. Fig. 2 is a back elevation of same and Fig. 3 a plan of same. Fig. 4 is a horizontal section of a modification. Fig. 5 is a plan of a modification of cone.

Referring to Figs. 1, 2 and 3, $a$ is a small inner boss of the usual size in ordinary propellers. $b$ are the blades cast or bolted on to the boss in any usual way. $c$ are disks preferably of metal attached to the forward and after ends of the boss $a$ by screws $d$ or in other suitable way. The disks are of any desired diameter according to the diameter the enlarged outer or false boss is required to be. The spaces between the roots of the blades and the disks are filled in with cement $e$ or other suitable adhesive light material not liable to deterioration by water. If desired and to assist in securing the cement &c in position metal rods $f$ may be passed through the cement and attached to the disks or blades. These rods also aid to hold the disks up to the boss $a$. $g$ are a number of bars of metal curved to a conical shape riveted together at the apex, forming a cage like structure and attached by bolts $h$ or otherwise to the boss or disk at the aft end of the propeller the hollow within the cone being filled in with cement $i$ or other suitable material. An enlarged outer or false boss and cone of the desired diameter, shape, and lightness is thus constructed very cheaply. Cones or cages of this kind may be attached to ordinary bosses if required.

Instead of making the cone or cage of a number of bars it may consist of a hollow conical shell as shown in Fig. 5 attached to the boss and having perforations $j$ in grid form the hollow being filled in with cement &c as before described.

To reduce the resistance on the forward side of the false boss to the passage thereof through the water I attach to the forward disk $c$ or to an ordinary boss of large size a hollow conical piece K preferably by bolts $l$ in recesses $m$. The forward end of the cone K is of greater diameter than, and overlaps the screw tail shaft eye, or boss $n$ in the stern post $o$. The cone $k$ may be in one piece but preferably is made in two semi circular pieces as shown. This overlapping of the conical piece quite prevents ropes or the like getting wound round the shaft between the propeller and stern post eye, while at the same time easy water lines of the false boss are secured, and resistance reduced compared with ordinary bosses. In order to maintain easy entrance of water to the false boss when the greatest diameter thereof is, as shown, very large compared with the stern post eye, I arrange the parts so that the forward end of the cone $k$ is somewhat greater in diameter than the stern post eye $n$ and close in front of such end I affix to the stern post $o$ or may be to the ships' plating, by riveting or otherwise, a piece or pieces $p$, preferably consisting of two semi circular pieces of angle iron, or the like, about the same external diameter as the adjacent end of the cone $k$, and forward of such angle iron I place filling material $q$ which may be wood, cement or other suitable material thinned down forwards to the hull at $r$ as shown to reduce resistance to the flow of the water to the propeller. The bolt recesses $m$ in the cone $k$ are also filled up with cement.

Referring to Fig. 4, this view shows the diameter of the false boss somewhat smaller relative to the stern post eye $n$ and the forward angle iron and filling is dispensed with, the overlapping forward end of the hollow cone $k$ being only sufficiently greater than the eye $n$ to pass easily thereon as shown while easy water lines to the false boss are still secured, and fouling by ropes &c prevented. This arrangement is also applicable to twin screw propellers the cone $k$ being arranged to overlap the tail shaft bearings on the ends of the stern tubes or V brackets.

I claim

1. The combination with a screw propeller boss of two disks attached to the forward and after ends of the boss and filling material between the disks, substantially as described.

2. The combination with a screw propeller boss of two disks attached to the forward and after ends of the boss and filling material between the disks, and rods connecting the two disks, substantially as described.

3. The combination with the boss of a screw propeller of a cone made of a metal cage-like structure, and filling material within the cage, substantially as described.

In testimony whereof I have signed my name to this specification in the presence of two subscribing witnesses.

WILLIAM MILLER WALTERS.

Witnesses:
  W. B. JOHNSON,
  GEO. WALTERS.